United States Patent [19]
Gambrill et al.

[11] Patent Number: 5,779,359
[45] Date of Patent: Jul. 14, 1998

[54] MIXER HAVING EXPOSED CLEAN-IN-PLACE BEARING ASSEMBLIES

[75] Inventors: Jeffrey S. Gambrill, Hilton; Thomas C. Durney, Piffard; Dominic Borraccia, Spencerport, all of N.Y.

[73] Assignee: General Signal Corporation, Rochester, N.Y.

[21] Appl. No.: 851,130

[22] Filed: May 5, 1997

Related U.S. Application Data

[63] Continuation-in-part of Ser. No. 767,127, Dec. 5, 1996.

[51] Int. Cl.$^6$ ..................................................... B01F 13/08
[52] U.S. Cl. ............................ 366/273; 366/331; 384/492
[58] Field of Search ...................... 366/273, 274, 366/314, 331; 384/492, 907.1, 912, 913; 416/3

[56] References Cited

U.S. PATENT DOCUMENTS

| | | | |
|---|---|---|---|
| 3,265,369 | 8/1966 | Harrison | 366/274 |
| 3,421,528 | 1/1969 | Gomez et al. | 366/274 |
| 3,694,341 | 9/1972 | Luck, Jr. | 366/273 X |
| 4,209,259 | 6/1980 | Rains et al. | |
| 4,653,519 | 3/1987 | Kanner | 366/273 X |
| 4,993,841 | 2/1991 | Lofgren et al. | 366/331 X |
| 5,368,390 | 11/1994 | Gambrill et al. | |
| 5,393,142 | 2/1995 | Meier | 366/274 |
| 5,407,272 | 4/1995 | Meier | 366/274 |
| 5,427,450 | 6/1995 | Gambrill et al. | |
| 5,470,152 | 11/1995 | Rains | 366/273 |
| 5,478,149 | 12/1995 | Quigg | 366/273 |
| 5,575,571 | 11/1996 | Takebayashi et al. | 384/492 |

FOREIGN PATENT DOCUMENTS

| | | | |
|---|---|---|---|
| 360767 | 3/1990 | European Pat. Off. | 366/273 |
| 399971 | 9/1990 | European Pat. Off. | 366/273 |
| 399972 | 11/1990 | European Pat. Off. | 366/273 |
| 64-56127 | 3/1989 | Japan | 366/273 |

*Primary Examiner*—Charles E. Cooley
*Attorney, Agent, or Firm*—M. Lukacher

[57] ABSTRACT

An improved immersible magnetically-coupled mixer has a plurality of rollable bearing assemblies readily cleanable by flushing in place and easily removable and replaceable without damage to either the mixer impeller or the bearings. The rollable bearings are resistant to corrosion, capable of running without lubrication, and have low propensity for batch contamination through wear. The rolling and fixed elements of the bearings are impervious to attack by the process materials being mixed, the rollable elements, preferably balls, can be formed of a hybrid ceramic such as silicon nitride, and the races can be formed of a nickel-beryllium or cobalt-chromium-tungsten alloy. A mixer impeller having a central bore is rotatably mounted at the upper end of the bore on the rollable bearings on an adapter collar receivable over an end of a fixed impeller shaft attached to the inner wall of a vessel at the bottom of the mixing space, which shaft may be on existing mixer shaft, thus requiring no modification of the shaft to retrofit the impeller assembly. The impeller contains magnets and is couplable in driving relationship to an external magnetic mixer drive. The bearings are exposed to the liquid in the vessel during agitation, and the impeller provides a continual flow of liquid across the bearing balls and races and the adapter collar, preventing formation of stagnant areas of process materials within the mixer assembly and permitting cleaning of all mixer surfaces by flushing.

7 Claims, 3 Drawing Sheets

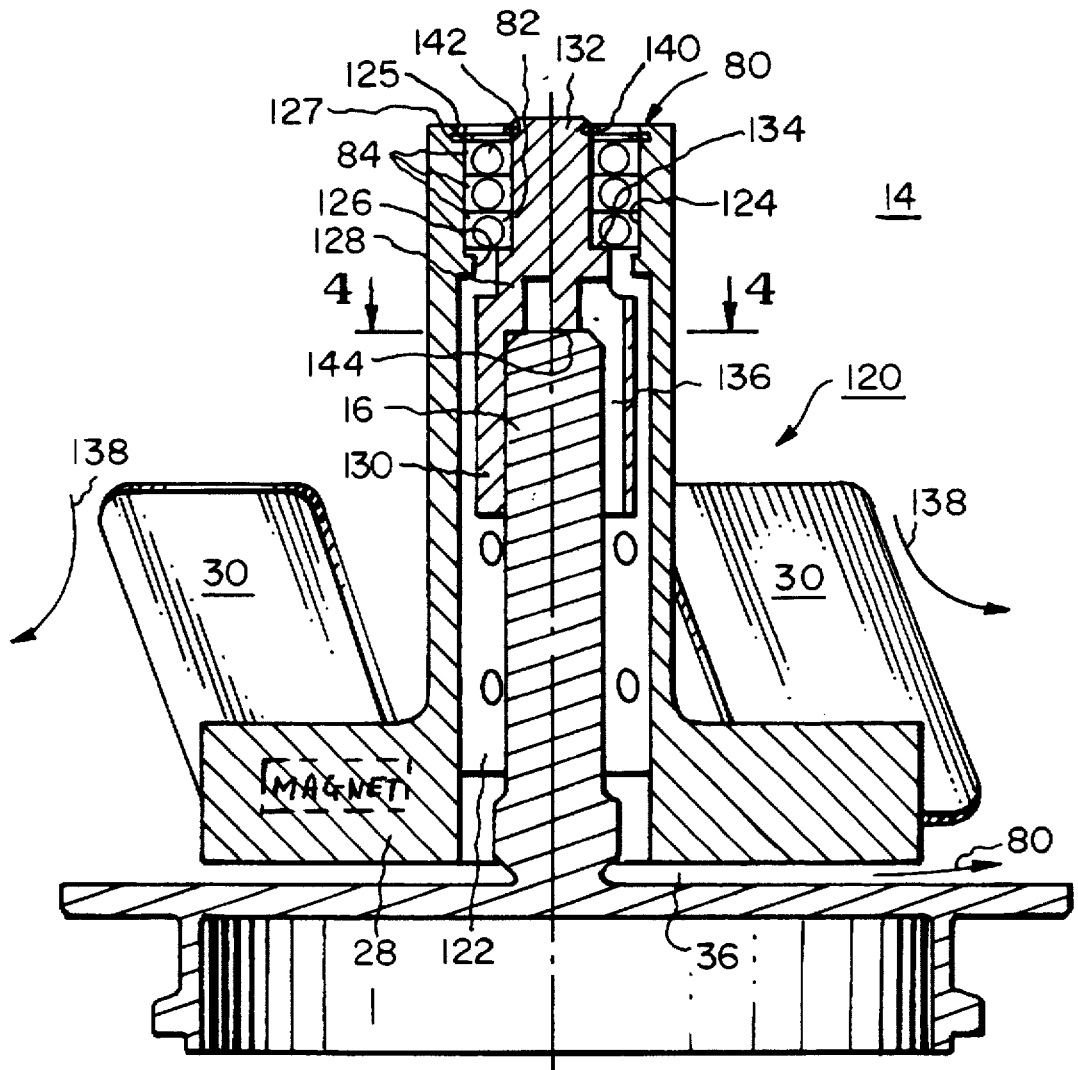
FIG. 3
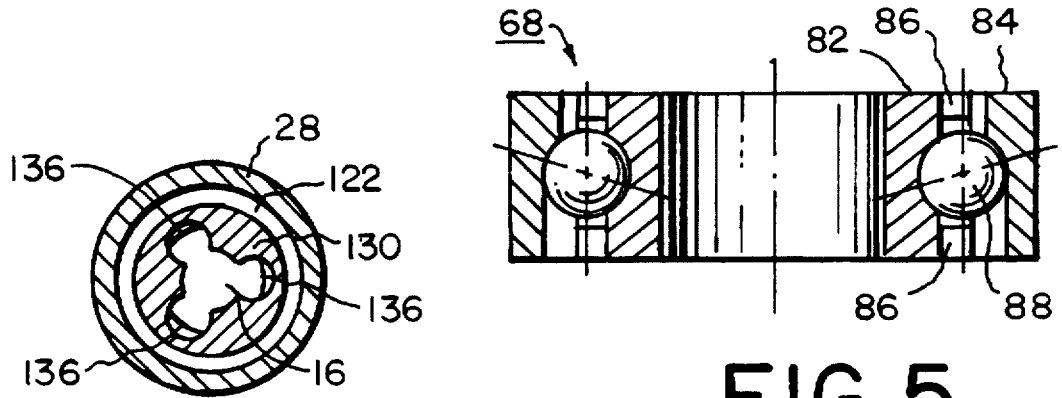
FIG. 4
FIG. 5

MIXER HAVING EXPOSED CLEAN-IN-PLACE BEARING ASSEMBLIES

DESCRIPTION

The present application is a continuation-in-part of pending application Ser. No. 08/767,127 filed Dec. 5, 1996 in the name of Jeffrey S. Gambrill et al.

The present invention relates to mixer systems, by which is meant systems for suspending, agitating and/or circulating materials, particularly liquids or liquid suspensions, and particularly to mixer systems for mixing aggressive materials, by which is meant toxic, hazardous, corrosive or other materials which need to be confined for proper handling, processing or for environmental, safety or health reasons.

In order to prevent escape of aggressive materials from the vessel in which they are mixed, it is desirable to confine the mixing apparatus entirely within the vessel without shafts extending through a wall of the vessel and without resort to either dynamic or static shaft seals. It is known to provide magnetic couplings which use confinement shells or the wall of the vessel to separate the driven impeller apparatus from the motor and other drive elements.

Sealless magnetically-coupled drives are particularly desirable for mixer systems disposed at the bottom of vessels, wherein the mixer apparatus is fully immersed in the materials being mixed, and wherein shaft seals of conventional mixers are prone to leak with extended use.

Three problems in the art of bottom mixer design are 1) how to prevent corrosion of the impeller bearings through contact with aggressive materials being mixed; 2) how to clean the bearing surfaces between process batches; and 3) how to remove and replace the impeller and bearings easily and without damage to either. An additional problem can be how to conveniently and economically retro-fit an existing mixer to accommodate improved bearing materials and bearing arrangement.

Magnetically-coupled bottom mixers typically utilize a ceramic sleeve bearing or bushing disposed on a fixed shaft, also known as a tank post, to support a magnetically-couplable rotatable impeller. See for example Rains et al., U.S. Pat. No. 4,209,259 issued Jun. 24, 1980. Ceramic sleeve bearing materials in common use are silicon carbide, alumina, and zirconia. These materials can provide excellent corrosion resistance, but they are quite brittle. Ceramic sleeve bearings are easily damaged through inadvertence during installation of an impeller onto its shaft within a vessel, and the damage may not be detected until the unit is placed in service, leading to substantial downtime and major loss in productivity. Such bearings are also quite vulnerable to shock and may be cracked or shattered during mixing by, for example, temporary instantaneous decoupling of the magnetic drive elements. Further, ceramic sleeve bearings may not be operated without lubrication by the process materials or by cleaning solutions, and they can be destroyed by running dry as can happen when a vessel is drained. Further, sleeve bearings in general, having close shaft tolerances over relatively large surface areas, are not readily cleanable by flush cleaning in place and tend to generate wear particles with use which may contaminate the process materials being mixed.

The above referenced parent application 08/767,127 ('127), describes an improved immersible magnetically-coupled mixer having rolling bearings which are readily cleanable by flushing in place and which are easily removable and replaceable without damage to either the impeller or the bearings. The bearings also are resistant to corrosion of the bearing surfaces, are operable without lubrication, and have low propensity for batch contamination through wear. The mixer includes long-wearing, corrosion resistant rolling bearings supporting a rotatable impeller, wherein the bearings are fully exposed to liquid materials in the vessel. In a preferred embodiment, the mixer is a magnetically-coupled bottom-mounted vessel mixer having an open and positively-driven flow path for process liquids and flush solutions through the bearings.

Parent application '127, shows an impeller having improved bearings disposed on a replacement stub shaft attached to a tank plate mounted in an opening in the bottom wall of a mixing tank or vessel. A new stub shaft, which is much shorter than the existing shaft and is shouldered to receive the inner bearing race of the bearing assembly. Fabrication of the new stub shaft can add to the cost of converting an existing vessel mixer to the improved design, and some disassembly of the vessel is required to install the new tank plate and stub shaft.

Thus, there is a need for an improved mixer system which includes the benefits of the mixer system disclosed in '127 and which also can be retrofitted to an existing vessel mixer system without replacement or modification of the shaft in the vessel or the tank plate.

It is a principal object of the present invention to provide an improved mixer system wherein an improved mixer impeller, having rolling bearings capable of running fully exposed to, and immersed in, aggressive materials without damage to the bearing elements, is supported by a pre-existing shaft.

It is a further object of the present invention to provide an improved mixer system wherein an improved mixer impeller having rolling bearings and a shaft adapter collar can be retrofitted to an existing shaft without modification to the shaft.

It is a still further object of the present invention to provide an improved mixer system wherein an improved mixer impeller having a shaft collar adapted for mounting on an existing fixed shaft is supported solely by a plurality of rolling bearing units near the upper end of the impeller.

Briefly described, in a mixer system embodying the invention an agitating impeller having a central bore is mounted for rotation on an impeller support, preferably an existing fixed shaft, attached to an inner wall, preferably the bottom, of a vessel or reactor. The impeller is provided with magnets which are magnetically couplable with a magnetic driver apparatus mounted outside the vessel coaxially with and opposite the shaft.

In an annular passageway between the impeller and the shaft and extending in reduced diameter beyond the end of the shaft is a collar adapter on which, in the region of reduced diameter, are disposed at least one, and preferably a plurality of, rolling bearing assemblies having inner and outer races disposed on the adapter and impeller, respectively. The impeller bore extends through the upper and lower surfaces of the impeller hub, and the impeller is off-spaced from the surface of the wall of the tank to provide a flowpath for liquid material through the bore, the bearings, and the collar adapter. The centrifugal flow of material across the vanes of the impeller during rotation causes a constant flow of material along the flowpath, preventing stagnation of process materials in the bearing assembly and providing for simple and thorough in-place flush cleaning of the flowpath.

The bearing assemblies are open to the materials in the vessel at all times and preferably are highly corrosion-resistant. Additionally, the bearings must be capable of running from time to time without lubrication and without damage to the bearing elements. The bearing assemblies may have races formed from a nickel-beryllium alloy, for example, Nibryl 360 available from Brush Wellman, Cleveland, Ohio USA, and rolling elements may be formed from a hybrid ceramic such as silicon nitride, for example, NORALIDE NBD-200 available from Norton Industrial Ceramics Corp., East Granby, Conn. USA, meet these requirements. An additional advantage of nickel-beryllium alloy is that it is ferro-magnetic which facilitates substantially the precision lathe machining of races therefrom. Rolling elements may take the form of cylinders, tapered cylinders, needles, or, preferably, balls.

The foregoing and other objects, features, and advantages of the invention, as well as presently preferred embodiments thereof, will become more apparent from a reading of the following description in connection with the accompanying drawings in which:

FIG. 3 is an elevational view partially in cross-section of a magnetically-couplable mixer in accordance with the invention mounted in a vessel at the bottom of the mixing space, showing the flow pattern in liquid material being mixed including flow through the bearings supporting the impeller;

FIG. 4 is a cross-sectional view taken along line 4—4 in FIG. 3; and

FIG. 5 is a cross-sectional view of a ball bearing assembly in accordance with the invention.

Figure 1:
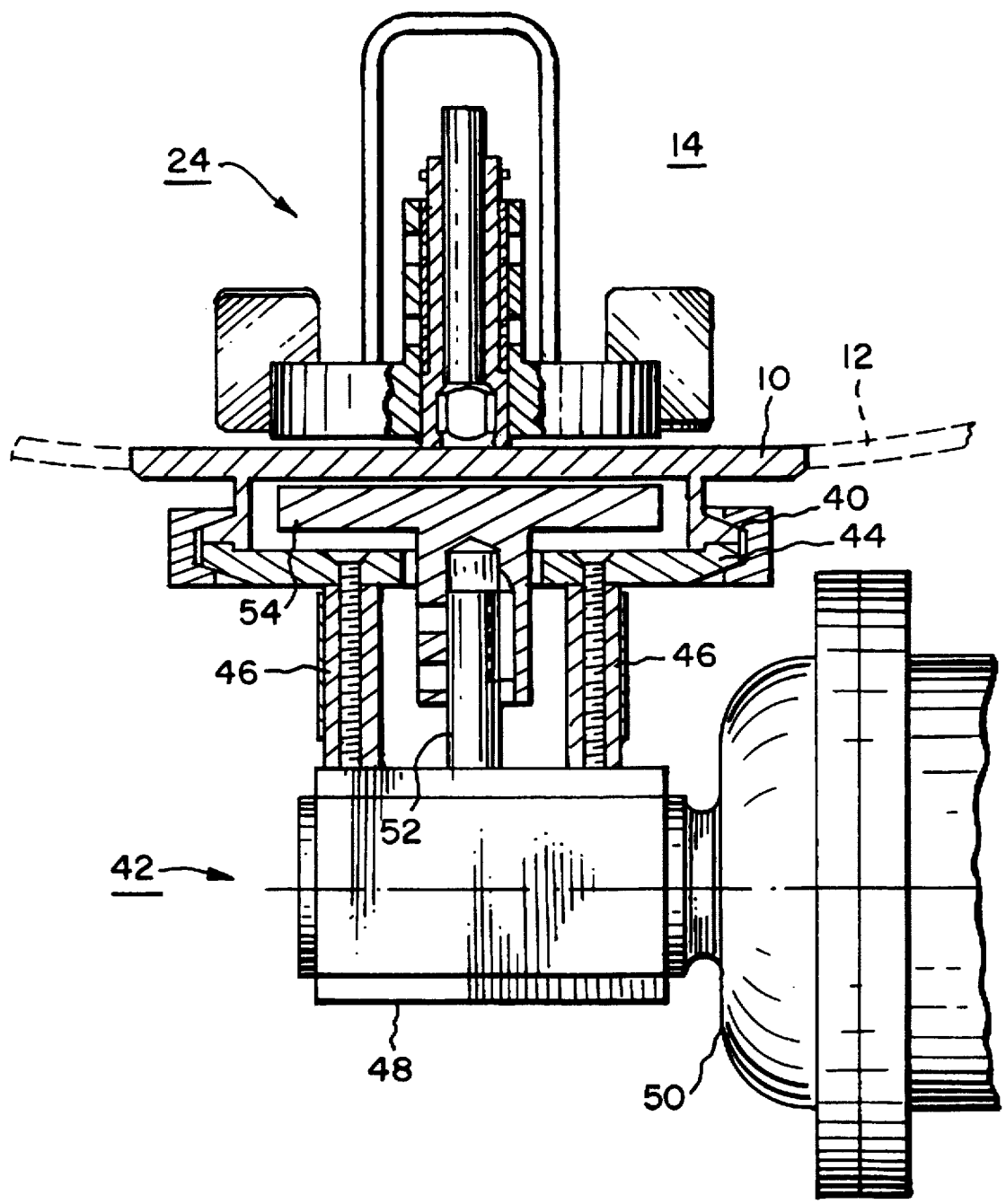
FIG. 1 is an elevational view partially in cross-section of a prior art magnetically-coupled mixer mounted in a vessel at the bottom of the mixing space, showing a sleeve bearing or journal supporting an impeller.
Figure 2:
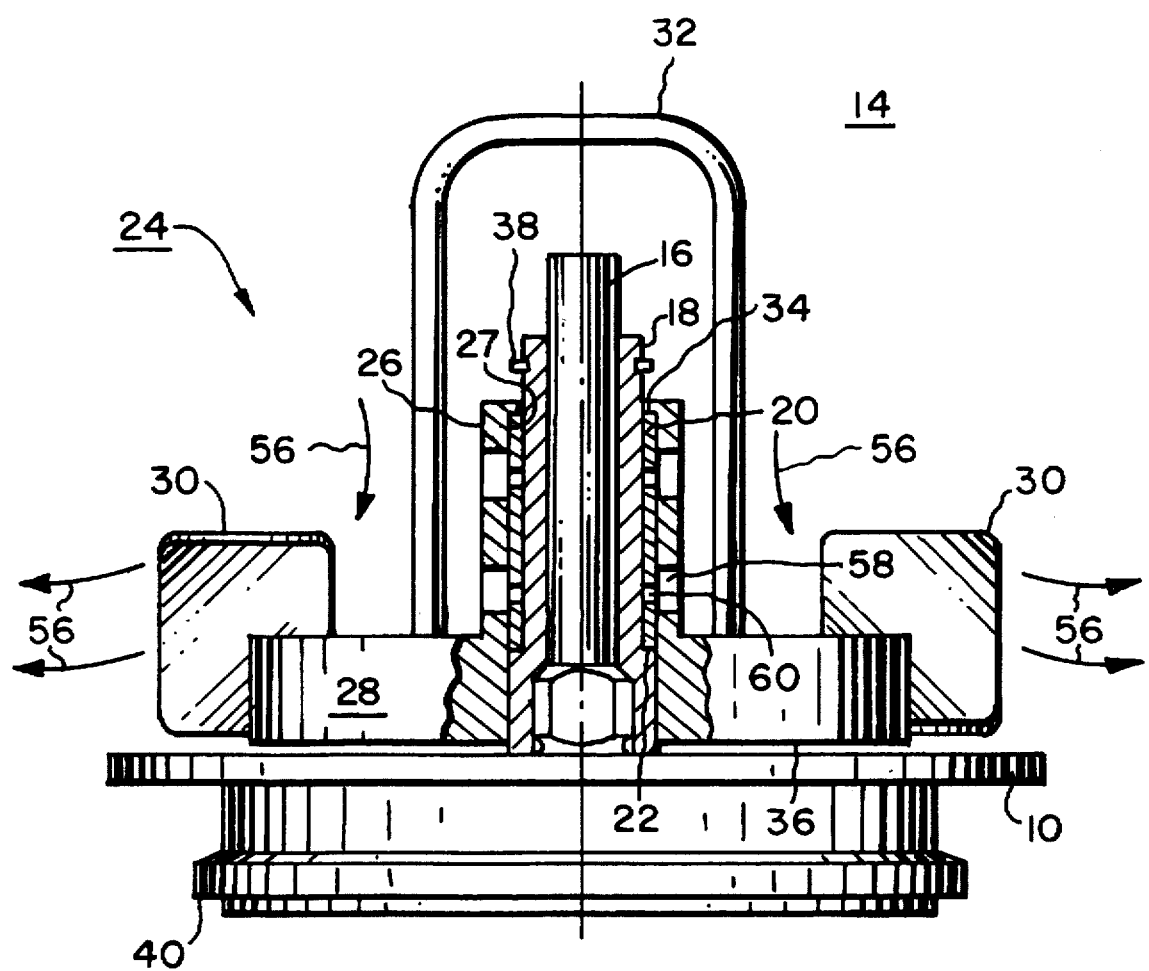
FIG. 2 is an enlarged view of the prior art in-vessel mixing apparatus shown in FIG. 1, showing the flow pattern in liquid material being mixed and the lack of flow across the bearing surfaces of the sleeve bearing.

Referring to FIGS. 1 and 2, there is shown a magnetically-coupled mixer mounted in a vessel at the bottom of the mixing space in accordance with the prior art. A tank plate 10 is inserted as by welding into the wall 12 of a vessel, preferably at the bottom of the mixing space 14 within the vessel. A stationary cylindrical shaft 16 is attached as by welding to plate 10 and may be fitted with a stationary wear sleeve 18, preferably formed from ceramic. Wear sleeve 18 is itself provided with a precision-machined sleeve bearing 20, also called a bushing or a journal, which is retained at its lower end in step 22 in sleeve 18. Sleeve bearing 20 is formed, typically, from a ceramic such as silicon carbide. Impeller assembly 24 is disposed on sleeve bearing 20, which in the alternative may be fitted to turn with assembly 24 and slidably bear on its inner surface on wear sleeve 18, or it may be stationary with sleeve 18 and slidably bear on its outer surface on assembly 24. Assembly 24 includes a hub extension 26 having a central bore 27 of substantially the same diameter as the outer diameter of sleeve bearing 20, a hub 28 containing one or more permanent magnets (not visible) encased in, preferably, stainless steel, a plurality of mixing vanes 30 attached to hub 28, and a handle 32 for removing or replacing assembly 24. Hub extension 26 is provided with an inwardly-extending flange 34 at its upper end, which flange rests upon the upper end of sleeve bearing 20, thereby defining the height of a clearance 36 between hub 28 and tank plate 10. Assembly 24 is retained on the mixer shaft by retaining clip 38.

Tank plate 10 is provided on its underside with a flange 40 for mounting a magnetic drive assembly 42 for rotatably driving impeller assembly 24. Drive assembly 42 includes a drive flange 44 matable with flange 40 and supporting standoffs 46 to transmission 48 supporting and driven by electric drive motor 50.

Output shaft 52 of transmission 48 is disposed coaxially with stub shaft 16 and is provided with a drive magnet 54 magnetically couplable through tank plate 10 with magnets 29 in impeller assembly 24.

The flow pattern 56 produced in the materials being mixed by impeller assembly 24 includes only minimal flow across the bearing surface of sleeve bearing 20, even though hub extension 26 and bearing 20 are provided with a plurality of access ports 58 and 60, respectively.

An improved magnetically-couplable impeller assembly 120 for use with existing shaft 16 in accordance with the invention is shown in FIGS. 3 and 4. Components of assembly 120 of like function to those in prior art assembly 24 and the '127 application bear like numbers. A hub 28 contains magnets (not visible) for rotatably driving assembly 120 in coupled relationship with magnetic drive assembly 42 (not shown in FIG. 3). Hub 28 is provided with a plurality of mixing vanes 30 and a handle (not shown), and contains an axial bore of substantially larger diameter and length than the diameter and length of mixer shaft 16. The axial bore in hub 28 preferably is divided into first and second regions 122 and 124, respectively, which may or may not be of equal diameter, and which further are separated by a shoulder 126 for retaining an outer bearing race 84 of a rolling bearing assembly 68 thereupon. A plurality of ganged bearing assemblies, for example three as shown in FIG. 3, is preferred for improved axial and radial support of the impeller, the outer bearing races 84 being retained in bore 124 by snap ring 125 in groove 127.

Disposed within the axial bore in hub 28 is an adapter collar 128. Collar 128 has a downwardly open cup-shaped lower portion 130, which fits snugly and non-rotatably over the upper end of shaft 16, and a rod-shaped upper portion 132 for receiving and radially supporting the inner races of bearing assemblies 68. A shoulder 134 in portion 132 supports the inner race 82 of the lowest bearing assembly. Preferably collar 128 is provided with a plurality of passages 136 for liquid flow between the bearings and the interior of portion 130, as shown in FIGS. 3 and 4.

Because the liquid flowpath is open at its upper and lower ends to the mixing space 14 through the bearing races and passages 136 and bore 122, the flow pattern 138 produced in the materials being mixed by impeller assembly 120 includes a strong flow component 80 through bearing assemblies 68 and clearance 36. If desired, the pitch of the vanes or the direction of rotation can be reversed to provide a material flow pattern opposite in direction to pattern 138. In either flow direction, flow component 80 prevents stagnation of process materials within the mixer apparatus during mixing and permits easy and thorough cleaning of the bearing surfaces and mixer surfaces by flushing in place.

Bearing assemblies 68 are shown in detail in FIG. 5 and are substantially as shown and described in '127. Each assembly has an inner race 82, an outer race 84, a singular retaining ring 86, and a plurality of rollable bearing elements 88, preferably balls. Alternatively, in some applications, rolling elements in the form of cylinders, tapered cylinders, or needles may be substituted for balls 88. The construction of assemblies 68 is conventional.

For high corrosion resistance to aggressive materials, non-galling wear surfaces, long operating life, resistance to breaking or cracking, and ease of flush cleaning, we have found a superior combination of materials for forming the races and rolling elements of bearing assemblies 68. Bearing assemblies in accordance with the present invention are virtually immune to particle shedding from wear during mixing and may be run dry for extended periods of time without damage to the races or rolling elements.

Preferably, both the inner and outer races 82 and 84 are formed from a nickel-beryllium alloy, preferably NIBRYL 360.

This material is highly resistant to oxidation by most acids and bases, is non-sparking, and is magnetic. Its magnetic property is highly useful in lathe machining of the material to form the races.

Preferably, the rolling elements 88 are formed of a silicon nitride hybrid ceramic, preferably NORALIDE NBD-200. This material is highly unreactive with most aggressive chemicals and has a Rockwell C hardness greater than 70.

Retro-fitting of a vessel equipped for mixing in accordance with the prior art shown in FIGS. 1 and 2 is simple and rapid.

After release of retaining clip 38, prior art impeller assembly 24 is removed along with sleeve bearing 20 and wear sleeve 18, leaving mixer shaft 16 extending upwards from tank plate 10. No modification of the vessel or of shaft 16 is required.

Assembly 120 is preferably and easily assembled outside the vessel by installing bearing assemblies 68 into the upper end of bore 124 in hub 28, seated on shoulder 126 and secured by snap ring 125 in groove 127. Adapter collar 128 is inserted into hub 28 from the lower end thereof and further upwards through inner races 82 until seated on shoulder 134, and is secured therein by a snap ring 140 in a groove 142 in collar 128.

Assembly 120 is installed into the vessel by lowering the assembly onto shaft 16 so that lower portion 130 of collar is received by shaft 16 until the bottom 144 of cup portion 130 engages the top of shaft 16. The weight of assembly 120 is thus borne on the top of shaft 16, and assembly 120 is centered on the shaft. The depth of cup portion 130 is chosen to define the height of clearance 36 between the impeller and the tank plate, to provide adequate clearance for solution flow while also providing proper coupling between the impeller and the external magnetic drive.

From the foregoing description it will be apparent that there has been provided improved immersible magnetically-coupled mixing apparatus including improved corrosion resistant rolling bearings, wherein the bearings are fully exposed to liquids in an annular passageway within the mixing apparatus, and wherein the bearings are easily flush-cleanable, and wherein the improved apparatus may be installed on a prior art mixer shaft in the field without requiring modification to the shaft. Variations and modifications of the herein described mixing apparatus, in accordance with the invention, will undoubtedly suggest themselves to those skilled in this art. Accordingly, the foregoing description should be taken as illustrative and not in a limiting sense.

What is claimed is:

1. A mixer system for agitation of materials within a vessel, comprising:

a) a fixed mixer shaft disposed on a wall within said vessel;

b) a stationary adapter collar disposed coaxially on a free end of said fixed mixer shaft;

c) a mixer impeller having an axial bore and being disposed for rotation coaxially on said adapter collar; and d) at least one bearing assembly exposed to said materials and having races and rollable elements disposed within said axial bore between said adapter collar and said mixer impeller, said races being formed of a nickel-beryllium alloy and said rollable elements containing silicon nitride hybrid ceramic.

2. A mixer system in accordance with claim 1 further comprising a magnetically coupled drive system for rotatably driving said impeller, said system including a first driven magnet disposed within said impeller and a second drive magnet disposed outside said vessel and drivably connected to a motor, said first and second magnets being magnetically couplable through a wall of said vessel to cause said impeller to rotate.

3. A mixer system in accordance with claim 2 wherein said adapter collar includes a rod-shaped portion for receiving an inner race of said bearing assembly on an outer surface thereof and a cup-shaped portion for receiving said fixed mixer shaft therein, said rollable elements being disposed in rolling contact between said inner and outer races.

4. A mixer system in accordance with claim 3 wherein said rod-shaped portion of said adapter collar extends beyond said free end of said shaft, and wherein said system further comprises a plurality of bearing assemblies disposed in said bore between said rod-shaped portion and said impeller.

5. A mixer system in accordance with claim 3 wherein said bearing races define open cages for said rollable elements, and wherein a circulation pattern of said materials being agitated in said vessel includes a flow path through said open cages.

6. A mixer system in accordance with claim 1 wherein said rollable elements are selected from the group consisting of balls, needles, and rollers.

7. A mixer system in accordance with claim 1 wherein said races and rollable elements are formed of materials resistant to corrosion by said materials in said vessel.

* * * * *